G. C. POWELL.
COLLAPSIBLE COOP.
APPLICATION FILED MAR. 11, 1922.
1,437,676.
Patented Dec. 5, 1922.
3 SHEETS—SHEET 3.
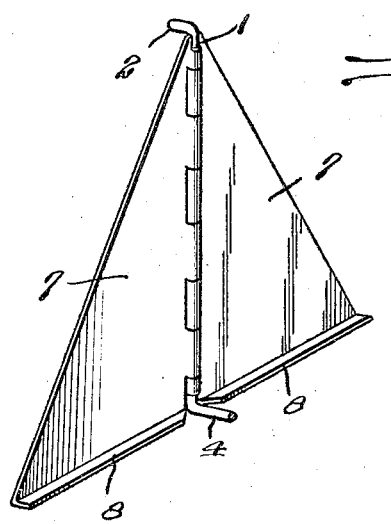
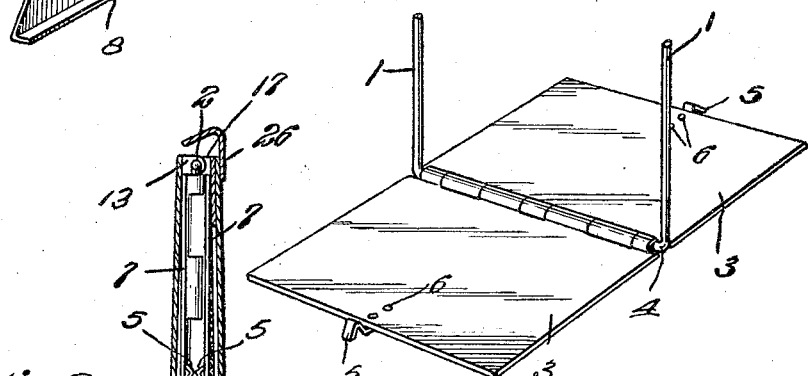
Inventor
G. C. Powell, Patented Dec. 5, 1922.

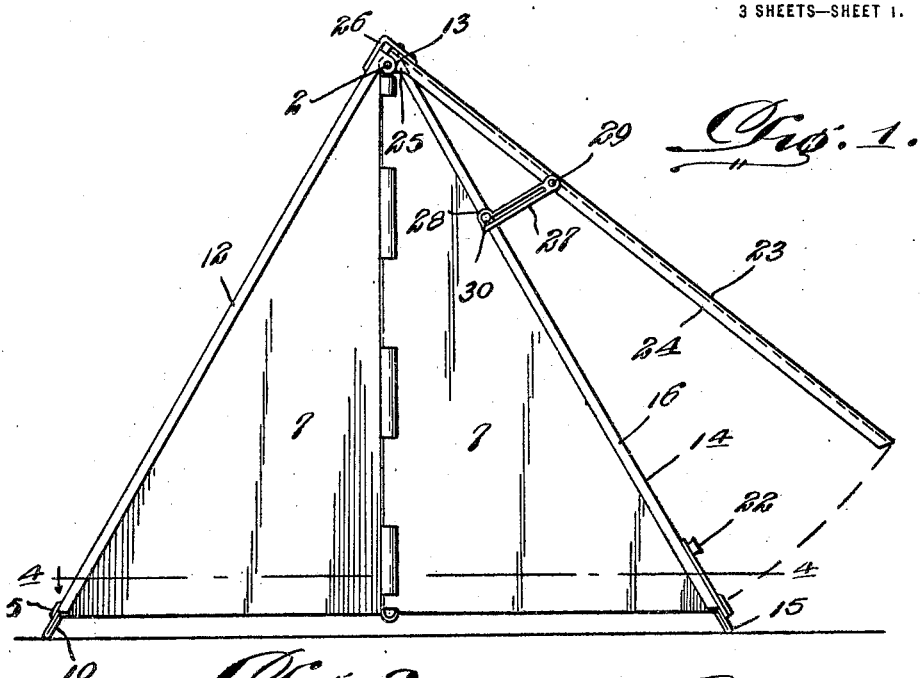
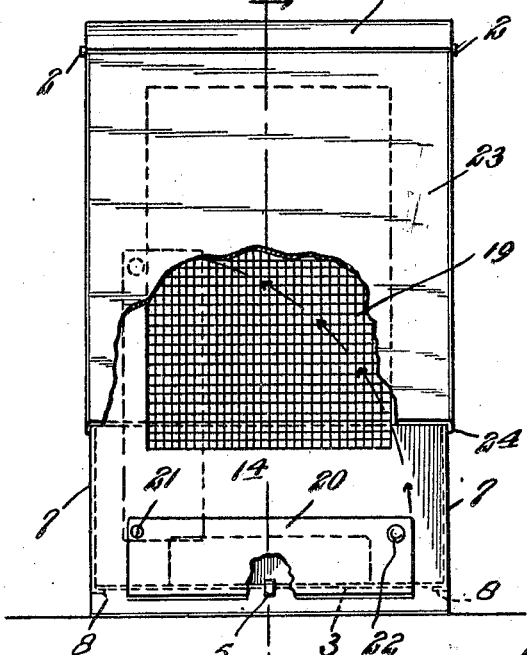
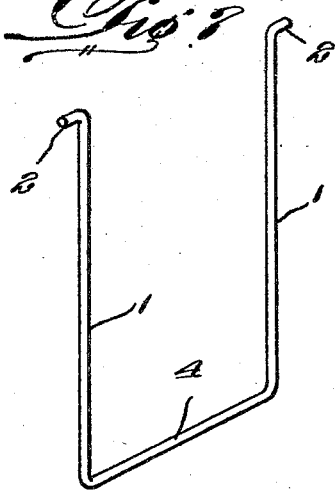

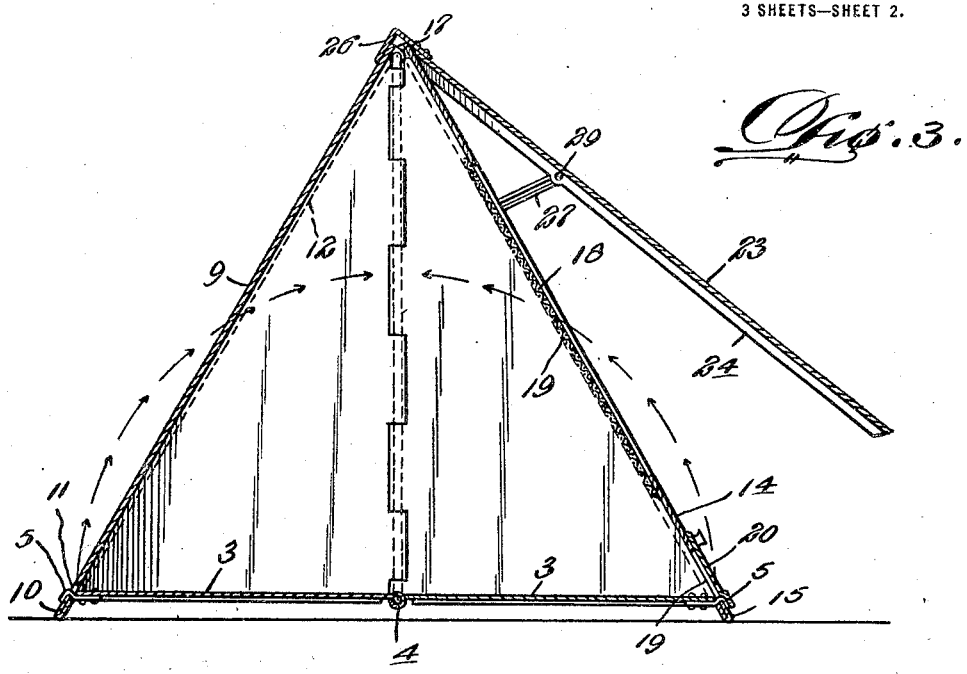
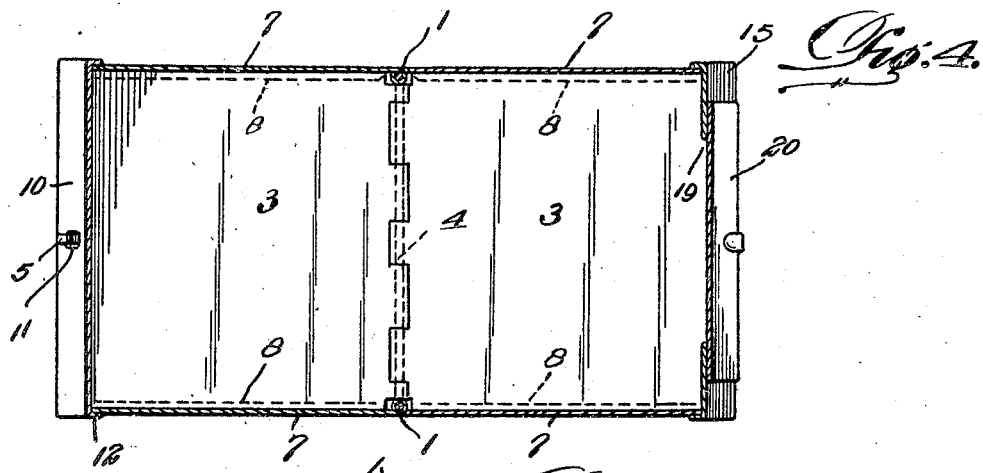
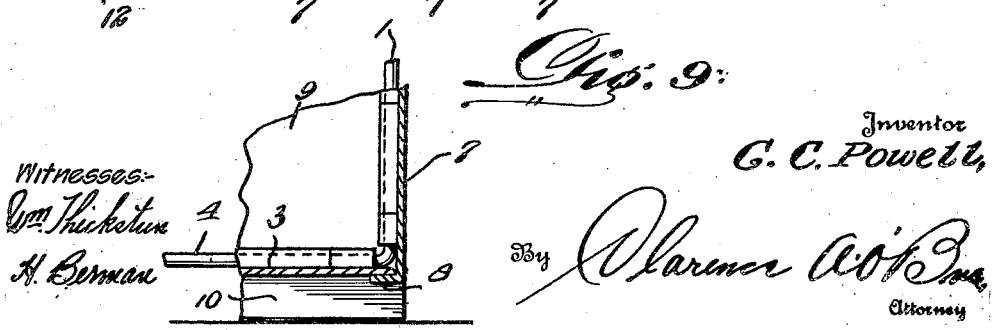

1,437,676

UNITED STATES PATENT OFFICE.

GEORGE C. POWELL, OF BANCROFT, MICHIGAN.

COLLAPSIBLE COOP.

Application filed March 11, 1922. Serial No. 542,874.

*To all whom it may concern:*

Be it known that I, GEORGE C. POWELL, a citizen of the United States, residing at Bancroft, in the county of Shiawassee and State of Michigan, have invented new and useful Improvements in Collapsible Coops, of which the following is a specification.

The object of my said invention is the provision of a collapsible chicken coop adapted to be easily reduced to small compass for storage and shipment and as readily set up ready for use, and one that is adapted to effectively protect chickens against rats and other rodents, and is susceptible of being rendered and kept free from mites and other vermin.

I would also have it understood that the coop can be used to advantage as a pigeon or bird house and as a brooder, the latter when the coop is heated by means not of my invention and not illustrated.

To the attainment of the foregoing, the invention consists in the improvement as hereinafter described and definitely claimed.

In the accompanying drawings, forming part of this specification:—

Figure 1 is a side elevation showing the coop constituting the best embodiment of my invention of which I am cognizant as the same appears when set up for use.

Figure 2 is a front elevation of the coop with the awning member partly broken away.

Figure 3 is a longitudinal vertical section taken on the plane indicated by the line 3—3 of Figure 2.

Figure 4 is a horizontal section on the line 4—4 of Figure 1.

Figure 5 is a detail perspective showing one side wall and a portion of the connecting member of the coop.

Figure 6 is a perspective showing the coop bottom and a portion of said connecting member.

Figure 7 is a perspective of the connecting member per se.

Figure 8 is a vertical section showing the coop as collapsed.

Figure 9 is a detail section showing the arrangement of the bottom on the flanges of the side wall sections.

Similar numerals of reference designate corresponding parts in all of the views of the drawings.

My novel coop is formed of metal, preferably galvanized iron, and among other elements it comprises a U-shaped connecting member 1 with outwardly-directed, angularly-disposed end portions 2.

The coop also comprises a bottom best shown in Figure 6 as made up of sheet-metal sections 3, hingedly connected by the lower portion 4 of the member 1. At their outer ends the sections 3 are provided with extended hooks 5, preferably riveted thereto as indicated by 6. When the coop is collapsed as shown in Figure 8 the bottom sections 3 rest flatwise against each other in the center of the bundle.

Each of the side walls of the coop comprises, as best shown in Figure 5, sheet-metal sections 7, hingedly connected to one upright of the connecting member 1. The said sections 7 at their lower ends are provided with inwardly-directed flanges 8.

The back wall 9 of the coop is also formed of sheet-metal. Said wall has its lower edge portion bent on itself, at 10, Figures 1 and 3, to stiffen said edge, and at 11 it is apertured to receive one of the bottom hooks 5. Flanges 12 are provided on the side edges of the wall 9, and are merged at their upper ends into apertured ears 13, Figures 1 and 8, hingedly connected to the terminals 2 of the connecting member 1.

The sheet-metal front wall 14 is bent on itself at its lower edge 15, is flanged at 16, and is provided on the flanges 16 with ears 17, hingedly connected to the said terminals 2 of member 1. At 18, Figure 3, is a large opening in the wall 14, which opening 18 is guarded by a section 19 of reticulated material, carried at the inner side of the wall 14 and appropriately connected thereto. Near its lower edge the said wall 14 is provided with an opening 19 for the passage of baby chickens, said opening 19 being closed when conditions so required by a swinging door 20, see full and dotted lines in Figure 2, hinged at 21 to the wall 14, and provided with a handle or finger piece 22.

When the coop is collapsed, Figure 8, the sections 7 of the side walls rest in nested relation at the sides of the folded bottom, and the back and front walls 9 and 14 rest at the outer sides of the side sections 7.

The sheet-metal awning member 23 is provided with side flanges 24 on which are apertured ears 25, hingedly connected to the said terminals 2 of member 1. At its upper end said awning member 23 is provided with an angular ridge-portion 26 which in the position shown in Figures 1 and 3 serves to exclude rain from the interior of the coop.

For the purpose of detachably securing the awning member 23 in the ventilating and sun-excluding position shown in Figures 1 and 3, I provide the straps 27. The said straps 27 are longitudinally slotted and are provided at the inner ends of the slots with offsets 28. They are pivotally connected at 29 to the member 23 and receive in their slots headed studs 30 on the sides of the front wall 14, which studs by engaging or resting in the said offsets 28 serve to detachably maintain the member 23 in the open position. When the offsets 28 are disengaged from the studs 30, the member 23 manifestly may be swung snugly against the wall 14 to close the coop and exclude the cold.

It will be understood from the foregoing that when the coop is set for use, the bottom sections 3 rest on the flanges 8 and against the side wall sections 7, and the bottom hooks 5 are engaged with the apertures of the back and front walls 9 and 14. In consequence casual collapsing of the coop is precluded. When, however, it is desired to collapse the coop, the hooks 5 are disengaged from the back and front walls, and the bottom wall sections 3 are swung upwardly, and the side sections 7 are swung inwardly, after which the back and front walls and the awning member 23 are arranged as shown in Figure 8. To set the coop for use, the operation described is reversed.

I have entered into a detailed description of the construction and relative arrangement of the parts embraced in the present and preferred embodiment of my invention in order to impart a full, clear, and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. A collapsible metallic coop comprising a U-shaped connecting member with upper, outwardly-directed end portions, bottom sections hingedly connected to the lower portion of said member and having extended hooks at their ends, side wall sections hingedly connected to the upright portions of said connecting member and having inwardly-directed flanges at their lower ends, a back wall having an aperture to receive one of said hooks and also having apertured ears hingedly connected to said end portions of the connecting member, and a front wall having an opening to receive the other hook and also having apertured ears hingedly connected to the said end portions of the connecting member.

2. A collapsible metallic coop comprising a U-shaped connecting member with upper, outwardly-directed end portions, bottom sections hingedly connected to the lower portion of said member and having extended hooks at their ends, side wall sections hingedly connected to the upright portions of said connecting member and having inwardly-directed flanges at their lower ends, a back wall having an aperture to receive one of said hooks and also having apertured ears hingedly connected to said end portions of the connecting member, and a front wall having an opening to receive the other hook and also having apertured ears hingedly connected to the said end portions of the connecting member; the said back and front walls being provided with side flanges and with lower edge portions bent upon themselves to increase the stiffness thereof.

3. A collapsible metallic coop comprising a U-shaped connecting member with upper, outwardly-directed end portions, bottom sections hingedly connected to the lower portion of said member and having extended hooks at their ends, side wall sections hingedly connected to the upright portions of said connecting member and having inwardly-directed flanges at their lower ends, a back wall having an aperture to receive one of said hooks and also having apertured ears hingedly connected to said end portions of the connecting member, and a front wall having an opening to receive the other hook and also having apertured ears hingedly connected to the said end portions of the connecting member, the front wall being provided with a screened opening and with a lower opening and movable means to close the same, in combination with an awning member opposed to the front wall and having apertured ears receiving the end portions of the connecting member, and means to detachably secure said awning member in open position.

In testimony whereof, I affix my signature.

GEORGE C. POWELL.